United States Patent Office 3,636,175
Patented Jan. 18, 1972

3,636,175
SELECTIVE HYDROGENATION USING METAL ARSENIDE OR ANTIMONIDE CATALYST
Gerhard P. Nowack, Bartlesville, Okla., assignor to Phillips Petroleum Company
No Drawing. Filed Nov. 23, 1970, Ser. No. 92,156
Int. Cl. C07c 5/06, 5/14, 5/16
U.S. Cl. 260—666 A
10 Claims

ABSTRACT OF THE DISCLOSURE

An improved method for selective hydrogenation of non-conjugated cyclic polyenes to the corresponding cyclic monoolefins with metal arsenide and metal antimonide hydrogenation catalysts which comprises contacting the feed polyenes with a double bond isomerization catalyst prior to, with or in conjunction with, contact of the feed.

BACKGROUND OF THE INVENTION

Field of the invention

This invention relates to selective hydrogenation of cyclic polyene hydrocarbons.

Description of the prior art

Heretofore, various processes and catalysts have been developed for the selective hydrogenation of non-conjugated cyclic polyene hydrocarbons to monoolefins. However, these processes have generally avoided the shifting of the position of double bonds because such shifting tends to produce conjugated unsaturation. It was believed that the hydrogenation of conjugated systems was less likely to be as selective as the hydrogenation of non-conjugated systems.

OBJECTS OF THE INVENTION

It is an object of this invention to provide improved selectivity and conversion when hydrogenating non-conjugated cyclic polyenes to cyclic monoolefins.

Other objects and advantages of the present invention will be apparent from the following summary of the invention, the detailed description of the invention, and the claims.

SUMMARY OF THE INVENTION

I have surprisingly discovered that double bond isomerization of the feed non-conjugated cyclic polyenes prior to, or simultaneously with, contact with a metal arsenide or antimonide hydrogenation catalyst provides improved selectivity and conversion rates in the conversion of the feed hydrocarbons to the corresponding cyclic monoolefin with minimal saturate formation. Accordingly, the improved process of the invention comprises contacting the feed non-conjugated cyclic polyene(s) with a suitable double bond isomerization catalyst, (e.g., MgO) prior to or in conjunction with contact of the feed with the metal arsenide, or metal antimonide hydrogenation catalyst.

DETAILED DESCRIPTION OF THE INVENTION

The hydrogenation catalysts which are employed in this invention are comprised of a metal of iron, cobalt or nickel in the form of its arsenide or antimonide derivatives, or mixtures thereof. In its preferred form, the hydrogenation catalyst of this invention is a supported, reduced nickel arsenate. Such nickel-arsenic combinations have the empirical formula $NiAs_x$, in which $x$ has a value from about 0.33 to about 2.0, preferably 0.6 to 1.0, and includes compounds such as $NiAs$, $NiAs_2$ and $Ni_3As_2$, the latter being particularly effective. The proportions of nickel and arsenic need not be stoichiometric; an excess of either the nickel or the arsenic can be present.

If the nickel is used in the antimonide form, the combination has the formula $NiSb_x$, in which $x$ has a value of from about 0.33 to about 2.0, preferably 0.6 to 1.0. Suitable forms are $NiSb$, $NiSb_2$, $Ni_3Sb$, $Ni_5Sb_2$, $Ni_7Sb_3$, $Ni_2Sb_3$, $Ni_3Sb_5$. The proportions of nickel and antimony need not be stoichiometric.

Accordingly, the nickel catalysts of the invention have an empirical formula $NiY_x$, wherein Y is arsenic or antimony and $x$ has a value from about 0.33 to about 2.0, preferably 0.6 to about 1.0. If cobalt or iron are substituted for nickel, the same empirical formula applies. Generally, then, the hydrogenation catalysts used in the invention have the formula MY in which M is a metal of nickel, cobalt or iron, Y is arsenic or antimony, and $x$ has a value from about 0.33 to 2.0, preferably 0.6 to about 1.0. Because of its greater effectiveness Y is preferably arsenic.

In further describing the hydrogenation catalysts of the invention, reference will primarily be made to the nickel arsenide species without meaning to limit the invention thereto. All uses and explanations of any one of the hydrogenation catalysts specifically designated are intended to apply to all of the hydrogenation catalysts employed in the process of the invention.

The above-described hydrogenation catalyst can be used in a supported or unsupported state. While a supported type hydrogenation catalyst is preferred, the catalyst can also be employed in a non-supported state as, for example, in the form in which the principle components are coprecipitated from a sol.

In its supported state, any suitable non-acidic or relatively non-acidic catalyst support can be used. Preferable supports include gamma-alumina, alpha-alumina, silica, titania, charcoal, calcium aluminate, natural or synthetic molecular sieves and combinations of these materials. In general the support will have a surface area of about 1 to about 400 square meters per gram.

In the preparation of the supported hydrogenation catalysts, the metal and arsenic, or antimony, can be simultaneously deposited on the support as, for example, by precipitating nickel arsenate on the support; or, the support can be impregnated with the metal and the arsenic, or antimony, in individual treatments. In either instance, sufficient metal is employed to deposit about 0.1 to about 20, preferably from about 0.5 to about 10, weight percent nickel on the support; and sufficient arsenic, or antimony is employed so as to provide a finished catalyst containing from about 0.5 to about 50 weight percent, preferably 1.0 to 10 weight percent arsenic, or antimony.

Additionally, a suitable catalyst support can be, if desired, impregnated with inorganic compounds, including salts, nitrates, halides, and so forth of the metal of choice. For example, arsenic trioxide in an ammoniacal solution can be employed as an impregnant.

Under any method of preparation, the support, after deposition thereon of the materials, can be washed to remove undesirable salts, dried, calcined in air, and then reduced with hydrogen to produce the active supported metal arsenide or antimonide catalyst. Suitable reduction conditions include atmospheric pressure at 500–800° F. for 0.1 to about 20 hours. In some instances, the calcination in air step can be omitted.

The supported selective hydrogenation catalysts mentioned above have no appreciable skeletal isomerization activity; that is, when contacted with straight chain monoolefins or polyenes under the reaction conditions specified herein, they promote little branching of the molecule. Since skeletal isomerization ability is a function of catalyst acidity which is largely contributed by the support material, the use of acidic supports which promote such activity are to be avoided and the non-acidic supports are preferred. This is because the acidic supports do not give the selective hydrogenation results of the present invention. However, mildly acidic supports, such as the flame hydrolized aluminas, are satisfactory for use in the present invention if their acidic character is minimized or destroyed during the catalyst preparation. Accordingly, ammoniacal solutions or basic precipitants are preferentially employed in preparing the hydrogenation catalysts.

The double bond isomerization catalyst employed in the present invention is any solid catalyst having the ability to isomerize non-conjugated cyclic polyenes to conjugated polyenes. Of particular usefulness, and of preference for the present invention, is magnesium oxide.

In accordance with the present invention, the double bond isomerization catalytic material, comprising magnesium oxide or a magnesium compound convertible to magnesium oxide when heated to an elevated temperature, is activated as described hereinafter before use as a conversion catalyst. The activation comprises converting magnesium compounds other than magnesium oxide to magnesium oxide, and substantial removal of water, carbon dioxide and free oxygen from the catalyst. The anhydrous magnesium oxide resulting from the activation is an extremely active catalyst for promotion of the isomerization of non-conjugated cyclic polyenes to conjugated cyclic polyenes.

The double bond isomerization catalyst can be prepared by heating magnesium oxide, or a magnesium compound convertible to magnesium oxide, to a temperature of at least 800° F., preferably at a temperature of 900 to 1100° F., but at a temperature below the sintering temperature of about 1200° F. of the catalyst. During the activation of the catalyst by heating, the catalyst is maintained under inert conditions by carrying out the activation in the presence of nitrogen or other inert gas or in the presence of a light hydrocarbon which is dry to protect the catalyst from moisture. Heating of the catalyst is ordinarily carried out for a period of time ranging from about 0.1–24 hours.

The double bond isomerization catalytic material of the invention can be associated with a support material such as diatomaceous earth, silica gel, silica, and the like, when desired. The amount of magnesium oxide present when supported will range from 10–90 percent by weight of the total catalyst, the remainder being support material. A suitable method of preparing the MgO supported catalyst is to dry mix the ingredients before activation. The support material can be in any suitable form such as pellets, powder, and the like.

Magnesium compounds convertible to magnesium oxide when heated at an elevated temperature as defined that can be employed according to the invention include: magnesium carbonate, magnesium bicarbonate, magnesium nitrate, magnesium hydroxide, magnesium oxalate, magnesium acetate, and the like.

Cyclic polyenes which are selectively hydrogenated to the corresponding cyclic monolefin are non-conjugated cyclic polyenes having from 7–30 carbon atoms per molecule including alkyl derivatives thereof wherein the alkyl group contains from 1–5 carbon atoms. The polyenes contain from 2 to about 6 double bonds. Non-limiting examples of suitable cyclic polyenes include 1,5 cyclooctadiene, 3-methyl-1,5-cyclooctadiene, 3,7-diethyl-1,5-cyclooctadiene, 1,2,3,3 - tetra - n - butyl - 1,4 - cyclooctadiene, 1,5,9 - cyclododecatriene, 3 - ethyl - 1,5,9 - cyclododecatriene, 1,4 - cyclohexadiene, 1,5,9,13,17,21 - cyclotetracosahexaene, 1,5 - triacontahexaene, and the like. The unsubstituted non-conjugated diolefins having 7–15 carbon atoms per molecule are generally preferred because of their commercial importance.

The process of the invention can be carried out using separate contact of the feed with first the double bond isomerization and then the hydrogenation catalyst. Preferably, however, the hydrogenation reaction is carried out in a single reactor unit using mixture of the two separate catalysts. Generally, the reaction can be carried out by passing the feed hydrocarbon, either in the liquid or vapor state, into contact with the catalysts, the reaction zones, or zone, being maintained at a temperature range of from about 300–500° F., preferably 350–450° F. Where the feed is contacted with two separate catalyst beds, it is preferably pre-mixed with hydrogen before contact with the isomerization catalyst. However, the hydrogen can be introduced at the second stage only, if desired.

The hydrocarbon stream is passed into contact with the catalysts at a rate sufficient to provide a weight hourly space velocity of from about 0.1 to about 10. Hydrogen is introduced at a rate which is sufficient to provide a hydrogen to feed molar ratio of from about 0.1:1 to about 5:1 but ratios as high as 100:1 can be used, if desired to inhibit deactivating deposit formation on the catalyst. The pressure is suitably maintained in the range of from about atmospheric to about 1000 p.s.i.g., preferably from about 50 to about 500 p.s.i.g.

The hydrogenation, in a single unit reaction, or the contact of the feed hydrocarbons with the catalysts separately, can be carried out in the presence of a diluent which does not react under the conditions of contact such as paraffins, cycloparaffins, benzene and the like.

When using a single catalytic zone for the reaction, the amount of MgO employed can vary over a wide range. Generally, from about 0.5 to about 10 weight parts MgO per part supported metal arsenide or arsenate catalyst is employed, preferably from about 1 to about 5 parts per part.

The selectivity of the hydrogenation reaction can be improved by incorporating carbon monoxide in the feedstock. Carbon monoxide in amounts from about 500 to about 5000 p.p.m. of the feedstream are effective. The CO can be introduced to the reaction zone, or zones, with the hydrogen, with the feed, or it can be added separately.

Both the hydrogenation catalyst and double bond isomerization catalyst can be regenerated in a number of ways including conventional calcination in diluted air. In as much as the reaction conditions to which these catalysts are subjected are relatively mild, catalyst regeneration can be primarily directed to removal of viscous oil deposits. Accordingly, the catalysts can be regenerated by removing these deposits by oxidation or by working with a liquid aromatic solvent under conditions suitable for removing the deposits. Preferably, benzene, toluene, xylene or mixtures thereof are passed through the catalyst zone or zones at a temperature such as 200–250° F., the zone being thereafter flushed with warm hydrogen or an inlet gas such as nitrogen.

The cyclic monoolefin products of the invention are valuable as feedstocks in various chemical processes. For example, the cyclic monoolefins can be contacted with a suitable olefin disproportionation catalyst in the presence of ethylene to provide linear acyclic diolefins. Further, the monoenes can be used as monomers to provide various types of organic polymers.

The following examples are provided to illustrate the above described invention. However, the data as provided herein should not be construed to unduly limit the spirit and scope of the invention.

EXAMPLE I

Two runs were conducted to demonstrate the improvement obtained when using a suitable double bond isomerization catalyst up stream from a selective hydrogenation catalyst in the conversion of 1,5-cyclooctadiene (1,5-COD) to cyclooctene.

A magnesium oxide double bond isomerization catalyst was prepared by activating 8/10 mesh, commercial MgO in hydrogen for 24 hours. The bed of MgO (38.9 g.) was positioned upstream from a bed of nickel arsenide on alumina hydrogenation catalyst (17.4 g.).

The nickel catalyst was prepared as follows: 10/40 mesh gamma-alumina was impregnated with aqueous nickel nitrate solution. This material was dried, and then calcined for 5 hours in nitrogen at 900° F. The nickel impregnated alumina was then impregnated with aqueous arsenic acid solution. The composite was then dried, calcined in nitrogen for 5 hours at 1200° F., and then reduced in hydrogen for 2.5 hours at 800° F. Analysis of the catalyst showed that it had a nickel content of 8.3 weight percent and an arsenic content of 7.6 weight percent.

The liquid feed to the tandem catalyst zones was 10 weight percent 1,5-cyclooctadiene in pentane which was pressurized in a bomb with 5 atmospheres of carbon monoxide prior to introduction to the MgO bed. The results of the runs are summarized below in Table I. In Control Run 1, the feed and hydrogen were directly introduced into the zone containing the nickel arsenide catalyst. In Run 2, the process of the invention using MgO treatment prior to contact with nickel arsenide catalyst was employed. In both runs the temperature in the reaction zones was 400° F. and the pressure was 100 p.s.i.g.

TABLE I

| Run No. | Liquid feed rate, g./hour | H₃ feed rate, ft.³/hour | Product composition, wt. percent | | | | |
|---|---|---|---|---|---|---|---|
| | | | 1,5-COD | 1,4-COD | 1,3-COD | Monoene | -ane |
| 1 | 30 | 1.24 | 18.9 | 4.7 | 35.8 | 28.0 | 2.5 |
| 2 | 31 | 1.22 | 0.6 | 0.2 | 1.5 | 94.1 | 3.7 |

The example demonstrates that the contact of the 1,5-cyclooctadiene feed with a double bond isomerization catalyst such as MgO prior to contact with nickel arsenide catalyst dramatically increases the conversion and selectivity of the reaction to the desired cyclooctene.

EXAMPLE II

A third run was employed to demonstrate the process of the invention in the selective hydrogenation of 1,5,9-cyclododecatriene within a single catalytic reactor containing a mixture of the MgO double bond isomerization catalyst and the nickel arsenide hydrogenation catalyst.

The MgO double bond isomerization catalyst was activated at 1000° F. in hydrogen. The nickel arsenide on alumina (flame hydrolyzed alumina) catalyst was prepared in essentially the same manner as in Example I above. It was activated at 780° F. for about 16 hours. Analysis of this catalyst showed that it contained 8.6 weight percent nickel and 8.6 weight percent arsenic.

A fixed catalyst bed reactor was charged with an intimate mixture of 13.6 g. of the activated nickel arsenide on alumina catalyst and 27.8 g. of the activated MgO double bond isomerization catalyst. The liquid feed to the reactor was 10 weight percent of 1,5,9-cyclododecatriene in diluent cyclohexane. The hydrogen employed contained 2.7 volume percent carbon monoxide. The operating conditions and results are summarized in Table II.

TABLE II

Run No. 3

| | |
|---|---|
| Temperature, ° F. | 355 |
| Pressure, p.s.i. | 100 |
| Feed rate, g./hour | 32 |
| H₂ feed rate, ft.³/hour | 1.04 |
| Product compositions, percent: | |
| Monene | 89.4 |
| -ane | 4.1 |
| Others | 6.5 |

This example demonstrates that the process of the invention provides excellent conversion and selectivity when hydrogenating 1,5,9-cyclododecatriene to cyclododecene.

Reasonable variations and modifications of the above described invention are possible without departing from the spirit and scope thereof.

I claim:

1. In a process of hydrogenating non-conjugated cyclic polyenes to the corresponding cyclic monoolefin which comprises contacting a feed stream containing said non-conjugated cyclic polyene with a reduced hydrogenation catalyst comprising a metal of nickel, iron, or cobalt and a material of antimony or arsenic under hydrogenation conditions, the improvement comprising contacting said feed stream with a double bond isomerization catalyst prior to, or simultaneously with, the step of contacting said feed stream with said hydrogenation catalyst.

2. The process of claim 1 wherein said hydrogenation catalyst is supported on a material which is nonacidic gamma-alumina, silica, titania, charcoal, calcium aluminate, or natural and synthetic molecular sieves and said double bond isomerization catalyst comprises MgO.

3. The process of claim 2 wherein said hydrogenation catalyst has the formula $MY_x$ wherein M is a metal of nickel, iron or cobalt, Y is arsenic or antimony, and $x$ has a value from about 0.33 to about 2.0.

4. The process of claim 1 wherein said non-conjugating cyclic polyenes is a hydrocarbon compound having from 7 to about 30 carbon atoms per molecule, including alkyl derivatives thereof wherein the alkyl group has from 1–5 carbon atoms per molecule.

5. The process of claim 4 wherein said nonconjugated cyclic polyene is a nonconjugated cyclic diolefin.

6. The process of claim 4 wherein said nonconjugated cyclic polyene is 1,5-cyclooctadiene or 1,5,9-cyclododecatriene.

7. The process of claim 1 wherein said reaction conditions include a temperature of from about 300° F. to about 500° F., a pressure of from about atmospheric to about 1000 p.s.i.g., and a feed hydrocarbon weight hourly space velocity of from about 0.1 to about 10.

8. The process of claim 1 wherein carbon monoxide is introduced into the reaction zone.

9. The process of claim 7 wherein the feed stream is contacted first with the double bond isomerization catalyst and subsequently with the hydrogenation catalyst in a tandem arrangement of catalytic zones.

10. The process of claim 8 wherein the feed stream is contacted with a mixture of the double bond isomerization catalyst and the hydrogenation catalyst within a single catalytic zone.

References Cited

UNITED STATES PATENTS

| | | | |
|---|---|---|---|
| 2,361,613 | 10/1944 | Drennan | 260—683.2 |
| 3,340,317 | 9/1967 | Kenton | 260—666 A |
| 3,102,899 | 9/1963 | Cannell | 260—666 A |
| 3,472,906 | 10/1969 | Boerma et al. | 260—666 A |
| 3,567,790 | 3/1971 | Morita | 260—666 A |

DELBERT E. GANTZ, Primary Examiner

V. O'KEEFE, Assistant Examiner